(12) United States Patent
Yamamizu (10) Patent No.: US 11,816,233 B2
(45) Date of Patent: Nov. 14, 2023

(54) INFORMATION PROCESSING APPARATUS

(71) Applicant: CANON KABUSHIKI KAISHA, Tokyo (JP)

(72) Inventor: Hiroshi Yamamizu, Chiba (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 113 days.

(21) Appl. No.: 17/495,710

(22) Filed: Oct. 6, 2021

(65) Prior Publication Data
US 2022/0121760 A1 Apr. 21, 2022

(30) Foreign Application Priority Data
Oct. 16, 2020 (JP) .................. 2020-175007

(51) Int. Cl.
*G06F 21/60* (2013.01)
*G06F 21/55* (2013.01)
*G06F 21/57* (2013.01)

(52) U.S. Cl.
CPC .......... *G06F 21/608* (2013.01); *G06F 21/552* (2013.01); *G06F 21/575* (2013.01)

(58) Field of Classification Search
CPC ..... G06F 21/608; G06F 21/552; G06F 21/575
USPC ........................................ 726/26
See application file for complete search history.

(56) References Cited

U.S. PATENT DOCUMENTS

| | | | | |
|---|---|---|---|---|
| 7,472,420 B1* | 12/2008 | Pavlyushchik | ......... | G06F 21/56 713/188 |
| 2006/0041940 A1* | 2/2006 | Fang | ..................... | G06F 21/554 726/22 |
| 2007/0157288 A1* | 7/2007 | Lim | ...................... | H04L 63/105 726/1 |
| 2012/0278885 A1* | 11/2012 | Hira | .................... | G06F 11/1004 726/22 |
| 2014/0365823 A1* | 12/2014 | Michihata | ............. | G06F 9/4401 714/16 |
| 2016/0246960 A1* | 8/2016 | Chauvet | .................. | G06F 21/52 |
| 2020/0310821 A1* | 10/2020 | Michishita | ............ | G06F 9/4401 |

FOREIGN PATENT DOCUMENTS

| | | |
|---|---|---|
| JP | 2009301429 A | 12/2009 |
| JP | 2015069403 A | 4/2015 |

* cited by examiner

*Primary Examiner* — Michael S McNally
(74) *Attorney, Agent, or Firm* — CANON U.S.A., INC. IP Division (57) ABSTRACT

An apparatus includes a CPU, a CPU boot ROM that stores a program to be executed by the CPU, a secure microcontroller that detects modification of the program, and a secure-microcontroller boot ROM that stores a recovery program for recovering the program in response to the secure microcontroller detecting modification of the program. The secure-microcontroller boot ROM is accessible from the secure microcontroller, and is not accessible from the CPU.

15 Claims, 11 Drawing Sheets

INFORMATION PROCESSING APPARATUS

BACKGROUND OF THE DISCLOSURE

Field of the Disclosure

The aspect of the embodiments relates to an apparatus capable of detecting modification of a program to be executed by a processor and recovering the modified program.

Description of the Related Art

An apparatus includes a network interface and provides a file server function and a mail transmission and reception function to a user. Connecting the apparatus to a network may lead to unauthorized use of the apparatus due to unauthorized hacking. On the premise that it is impossible to exclude all risks from diversified cyber attacks, the concept of cyber resilience has gained importance in recent years. In cyber resilience, even if an apparatus is compromised by a cyber attack, the apparatus itself is restored to its previous state before the cyber attack.

BACKGROUND

Japanese Patent Laid-Open No. 2009-301429 discloses a technique for detecting tampering of software installed in a device at startup of the device. In a method for detecting tampering of software, the hash value of the software is calculated and compared with a master hash value, and, based on the comparison result, tampering of the software is detected. In Japanese Patent Laid-Open No. 2009-301429, upon detection of tampering of software, the use of the tampered software and other software that uses the tampered software is disabled.

Japanese Patent Laid-Open No. 2015-69403 describes an apparatus that starts a pre-installed recovery program stored in a first storage unit upon detection of tampering of a program stored in a second storage unit. In Japanese Patent Laid-Open No. 2015-69403, since both the second storage unit and the first storage unit are accessible from a control unit, the pre-installed recovery program stored in the first storage unit may be tampered with by access from the control unit. If both programs in the first and second storage units are tampered with, it is difficult to recover the apparatus.

SUMMARY OF DISCLOSURE

Accordingly, the aspect of the embodiment provides an apparatus including a processor; a memory configured to store a program to be executed by the processor; a detector configured to detect modification of the first program; and a second memory configured to store a recovery program for recovering the program in response to the detector detecting modification of the program. The recovery program is accessible from the detector, and not accessible from the processor.

Further features of the disclosure will become apparent from the following description of exemplary embodiments with reference to the attached drawings.

DESCRIPTION OF THE EMBODIMENTS

Embodiments of the disclosure will be described hereinafter with reference to the drawings. The following embodiments are not intended to limit the disclosure defined by the claims.

First Embodiment

System Configuration

Figure 1:
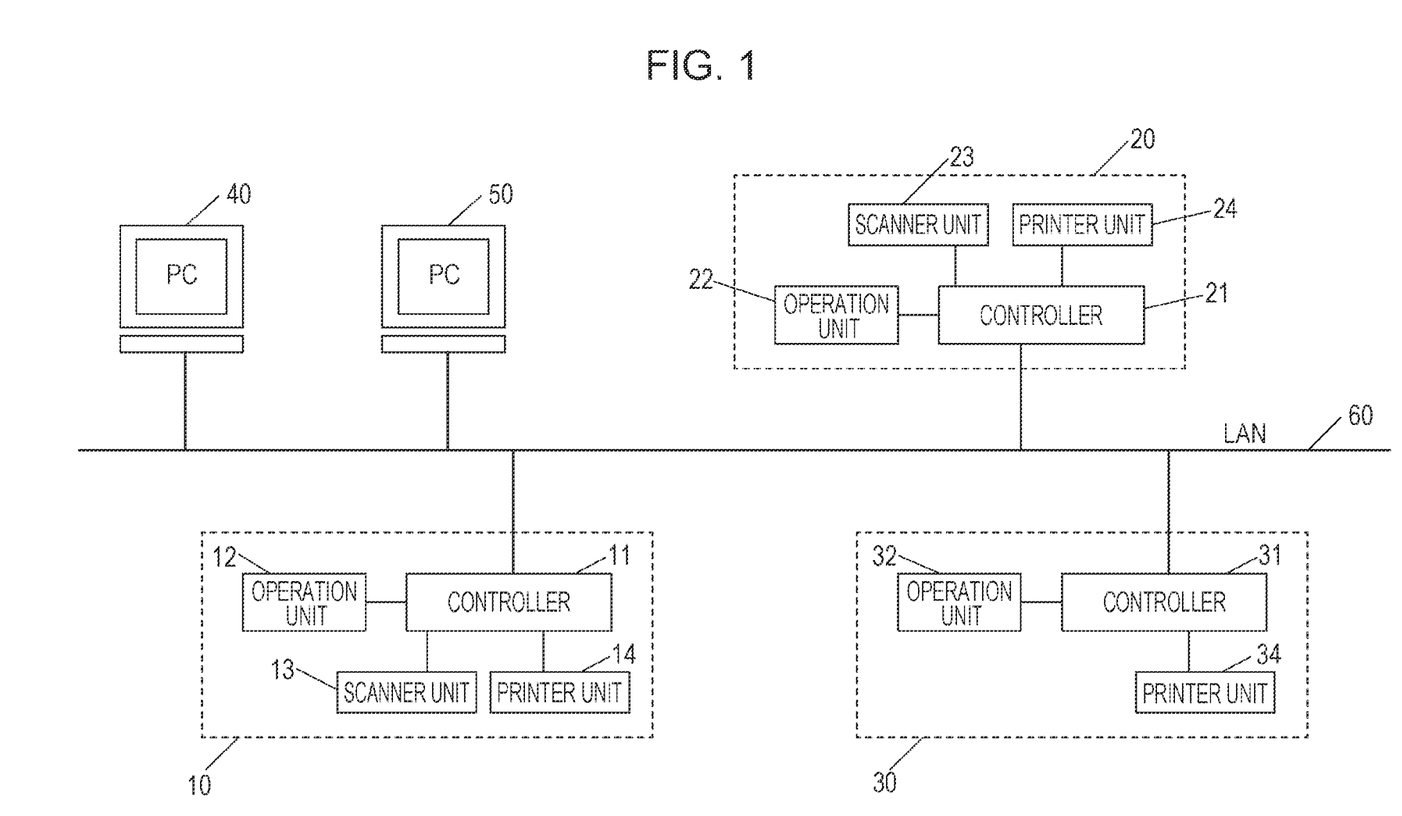
FIG. 1 is a block diagram illustrating a system including an image forming apparatus.

FIG. 1 is a block diagram illustrating a system including an image forming apparatus according to a first embodiment. The system illustrated in FIG. 1 includes host computers 40 and 50 and image forming apparatuses 10, 20, and 30. The host computers 40 and 50 and the image forming apparatuses 10, 20, and 30 are connected to a local area network (LAN) 60. The image forming apparatuses 10, 20, and 30 according to this embodiment may be connected to a network different from a LAN, such as a wide area network (WAN).

The host computers (hereinafter referred to as PCs) 40 and 50 have a personal computer (PC) function. The PC 40 can send and receive files or send and receive electronic mails using the File Transfer Protocol (FTP) or the Server Message Block (SMB) protocol via the LAN 60. Further, the PC 40 can issue a print command to the image forming apparatuses 10, 20, and 30 via a printer driver. The PC 40 can also periodically inquire of the image forming apparatuses 10, 20, and 30 about the states of the image forming apparatuses 10, 20, and 30. In response to a request from the PC 40, each of the image forming apparatuses 10, 20, and 30 returns status information indicating the state thereof, such as whether printing is possible, configuration information indicating the configuration thereof, and information on consumables (such as the amount of remaining toner and the amount of remaining paper) used therein. The same applies to the PC 50.

The image forming apparatuses 10 and 20 are apparatuses having a printer function (printing function) and a scanner function (reading function), and the image forming apparatus 30 is an apparatus having no scanner function but having a printer function. The image forming apparatus 10 includes a scanner unit 13 serving as an image input device, a printer unit 14 serving as an image output device, a controller 11 that controls the overall operation of the image forming apparatus 10, and an operation unit 12 serving as a user interface (UI). Also, the image forming apparatus 20 includes a scanner unit 23, a printer unit 24, a controller 21, and an operation unit 22. The image forming apparatus 30 includes a printer unit 34, a controller 31, and an operation unit 32.

In the following, a description will be given of the details of the image forming apparatus 10. Since the image forming apparatus 20 and 30 are similar to the image forming apparatus 10, the description thereof will be omitted. The image forming apparatus 10 is an example of an apparatus according to an embodiment of the disclosure.

Configuration of Image Forming Apparatus

Figure 2:
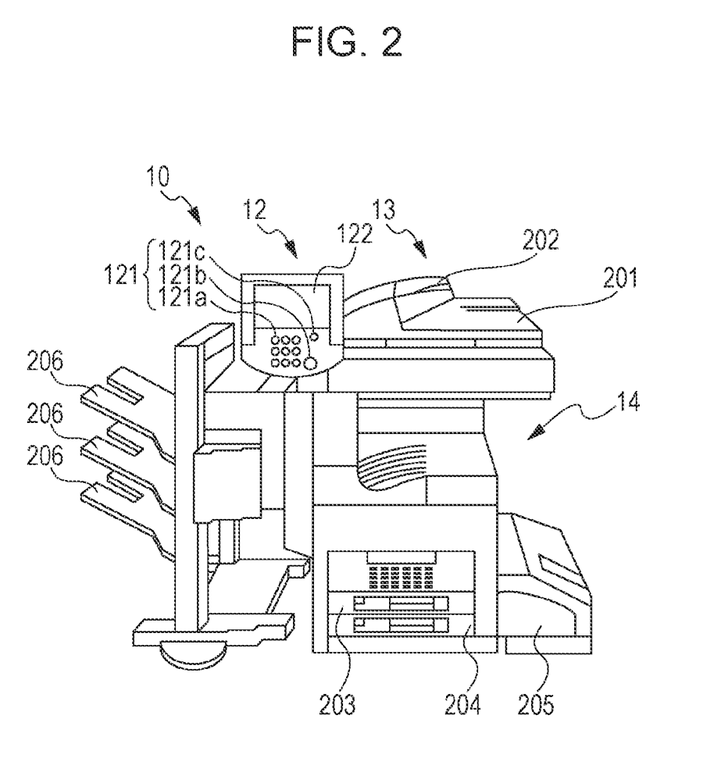
FIG. 2 is a perspective view of the image forming apparatus.

FIG. 2 is a perspective view of the image forming apparatus 10.

As illustrated in FIG. 2, the image forming apparatus 10 includes the operation unit 12 serving as a UI, the scanner unit 13 serving as an image input device, and the printer unit 14 serving as an image output device.

The operation unit 12 includes hard keys 121 and a display unit 122 that displays information. The hard keys 121 include a power-saving/return button 121c for allowing the image forming apparatus 10 to shift to a power saving mode or returning the image forming apparatus 10 from the power saving mode, a start key 121b for instructing the start of printing, and a ten-key pad 121a.

The scanner unit 13 is a device for reading an image formed on a document and acquiring image data. The image formed on the document is irradiated with light, and reflected light of the light is input to a charge-coupled device (CCD) sensor to convert information on the image into an electrical signal. The electrical signal is converted into a luminance signal constituted by each of red (R), green (G), and blue (B) and is output to the controller 11 described below.

Documents to be read by the scanner unit 13 are set on a tray 202 of a document feeder 201. In response to a user inputting an instruction to start reading by using the operation unit 12, the scanner unit 13 feeds the documents one by one from the tray 202 of the document feeder 201 and performs a document reading operation. The document reading method may not be an automatic feeding method using the document feeder 201, but may be a method in which a light source or a carriage provided with a CCD sensor is scanned across a document placed on a glass surface (not illustrated).

The printer unit 14 is a device for forming an image on a sheet using input image data. In this embodiment, the image forming method of the printer unit 14 is an electrophotographic method using a photosensitive drum or a photosensitive belt. However, the disclosure is not limited to this method. For example, the printer unit 14 may be of an inkjet printing type in which ink is ejected from a small nozzle array to print on a sheet.

The image forming apparatus 10 further includes a plurality of sheet cassettes 203, 204, and 205 for storing sheets on which images are to be formed by the printer unit 14. The image forming apparatus 10 further includes a plurality of sheet cassette discharge trays 206 to which sheets on which images have been formed by the printer unit 14 are discharged.

Detailed Description of Controller 11

Figure 3:
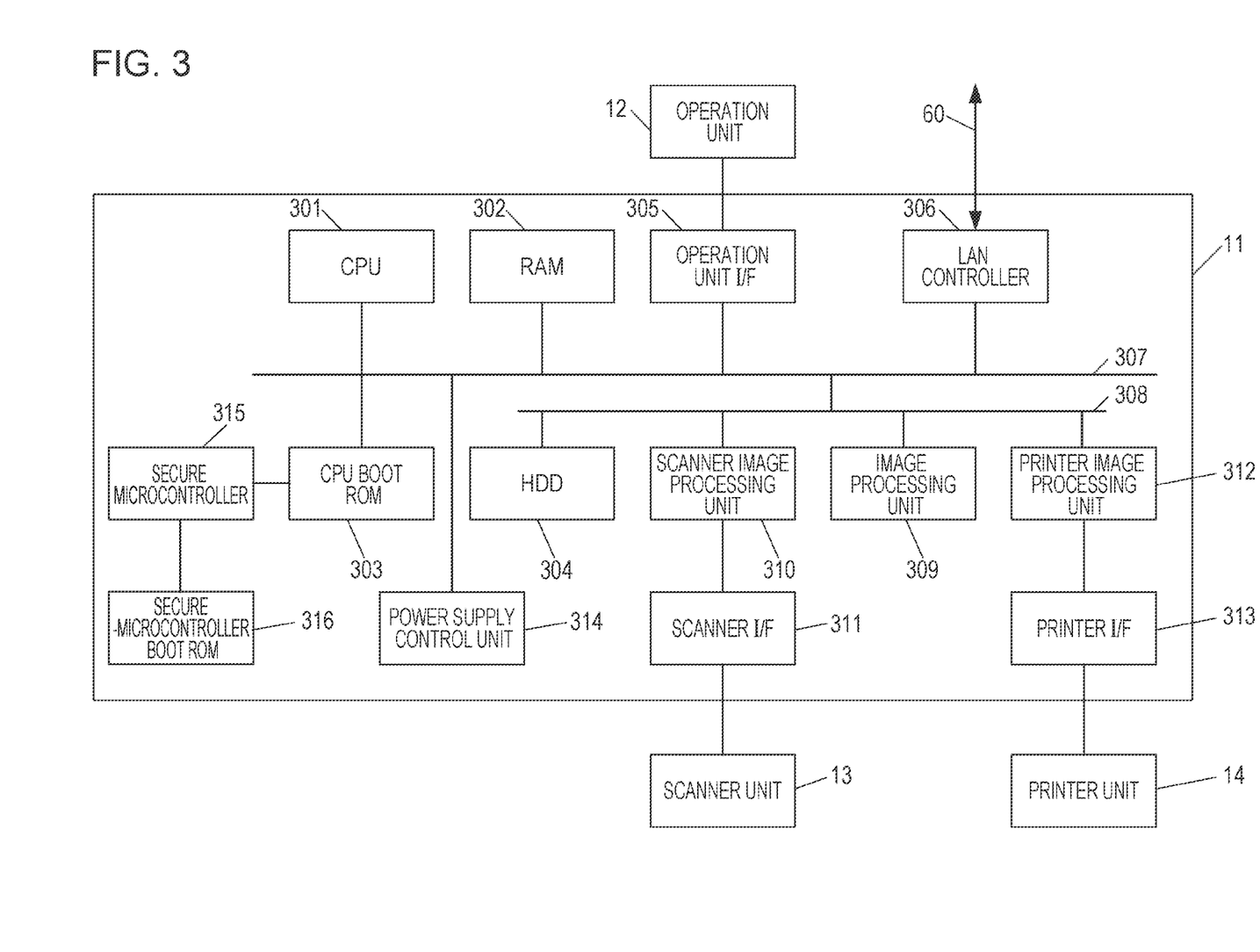
FIG. 3 is a block diagram illustrating the details of a controller.

FIG. 3 is a block diagram illustrating the controller 11 that controls the entire operation of the image forming apparatus 10. The controller 11 is electrically connected to the scanner unit 13 and the printer unit 14. Further, the controller 11 is communicably connected to the PCs 40 and 50, an external device, or the like via the LAN 60 or the like.

A central processing unit (CPU) 301 executes a program stored in a CPU boot read-only memory (ROM) 303 and accesses peripheral devices connected to the CPU 301. A random access memory (RAM) 302 is a system work memory for the CPU 301 to operate and is also a memory for temporarily storing image data. The RAM 302 includes a static random access memory (SRAM) and a dynamic random access memory (DRAM). The CPU boot ROM 303 stores a program for starting the CPU 301. The program is memory mapped to the CPU boot ROM 303 in a manner illustrated in FIG. 4B. The CPU boot ROM 303 is configured to be accessible from both the CPU 301 and a secure microcontroller 315. A connection bus configuration for access from both the CPU 301 and the secure microcontroller 315 will be described below.

A hard disk drive (HDD) 304 is configured to store system software and image data. An operation unit interface (I/F) 305 is an interface unit for connecting a system bus 307 and the operation unit 12. The operation unit I/F 305 receives image data for displaying an image on the operation unit 12 from the system bus 307 and outputs the image data to the operation unit 12. Further, the operation unit I/F 305 outputs information input from the operation unit 12 to the system bus 307.

A LAN controller 306 is connected to the LAN 60 and the system bus 307. The LAN controller 306 receives and outputs information and controls communication between the image forming apparatus 10 and a network. An image bus 308 is a transmission line for exchanging image data and is constituted by a Peripheral Component Interconnect (PCI) bus or an IEEE 1394 bus. An image processing unit 309 is for performing image processing and is configured to read image data stored in the RAM 302, enlarge or reduce an image such as a Joint Photographic Experts Group (JPEG) image or a Joint Bi-level Image Experts Group (JBIG) image, and perform image processing such as color adjustment. The data subjected to the image processing is stored in the RAM 302 or the HDD 304.

A scanner image processing unit 310 receives image data from the scanner unit 13 via a scanner I/F 311 and corrects, processes, and edits the received image data. The scanner image processing unit 310 determines whether the received image data represents a color document or a monochrome document, a text document or a photograph document, or the like. The determination result is attached to the image data. Such attached information is referred to as attribute data. A printer image processing unit 312 performs image processing on the image data with reference to the attribute data attached to the image data. The image data subjected to the image processing is output to the printer unit 14 via a printer I/F 313.

A power supply control unit 314 performs power supply control at startup or power off or controls changes in the internal power supply state of the image forming apparatus 10, such as a shift to the power saving mode and a return from the power saving mode. The power supply control unit 314 is also a unit that detects a restoration factor for returning from the power saving mode (such as reception of facsimile data or pressing of a switch), and also performs power supply control in response to a shift to a standby mode in accordance with the restoration factor.

The secure microcontroller 315 is a hardware device serving as a base of a trusted boot. The secure microcontroller 315 includes a fuse for storing key information inside the device. The secure microcontroller 315 uses the key information to detect modification of a secure-microcontroller program 402 stored in a secure-microcontroller boot ROM 316. If the secure microcontroller 315 determines that the secure-microcontroller program 402 has not been tampered with, the secure microcontroller 315 executes the secure-microcontroller program 402. Further, the secure microcontroller 315 verifies a CPU program 403 stored in the CPU boot ROM 303 and detects modification of the CPU program 403. If it is determined that the CPU program 403 stored in the CPU boot ROM 303 has been unmodified, the reset of the CPU 301 is canceled.

Upon detection of modification of the CPU program 403, the secure microcontroller 315 rewrites the CPU program 403 in the CPU boot ROM 303 using a recovery program 401 in the secure-microcontroller boot ROM 316 described below. To protect the secure microcontroller 315 against cyber attacks, in this embodiment, the CPU 301 is not allowed to access the secure-microcontroller boot ROM 316.

The secure-microcontroller boot ROM 316 stores a program for starting the CPU 301 and the secure-microcontroller program 402 for starting the secure microcontroller 315. The program for starting the CPU 301 (hereinafter referred to as "recovery program", as appropriate) is used to recover the CPU program 403 stored in the CPU boot ROM 303. The secure-microcontroller program 402 and the recovery program 401 are memory mapped to the secure-microcontroller boot ROM 316 in a manner illustrated in FIG. 4A. In one embodiment, the secure-microcontroller boot ROM 316 is configured to be accessible only from the secure microcontroller 315. To protect the secure-microcontroller boot ROM 316 against cyber attacks, the CPU 301 is not allowed to access the secure-microcontroller boot ROM 316.

Detailed Configuration of Boot ROMs

Figure 4A:
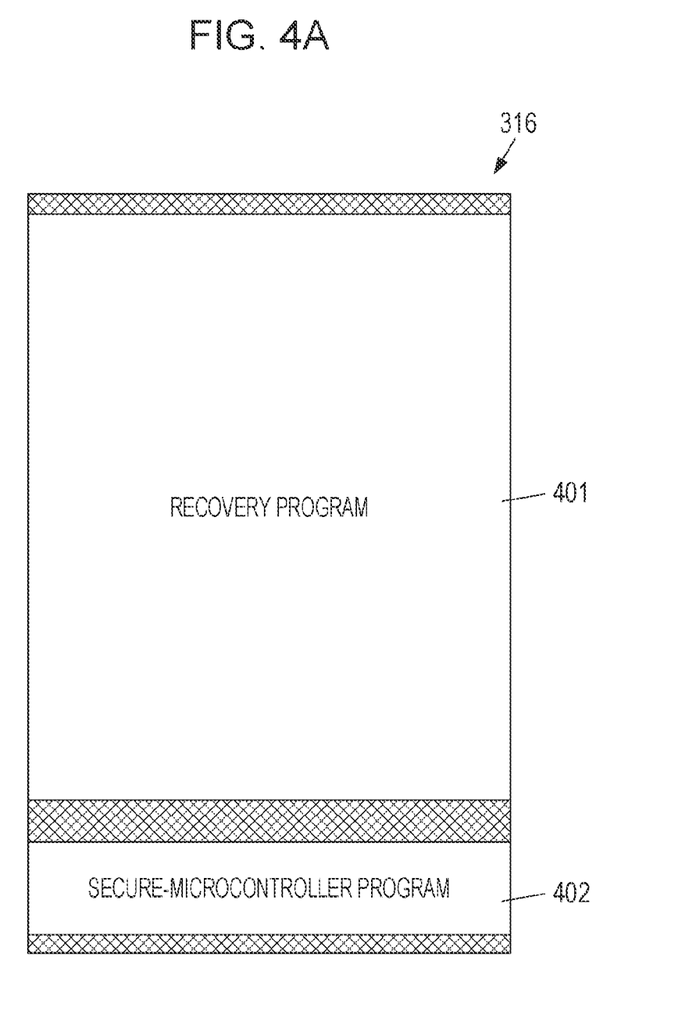
FIG. 4A is a diagram illustrating the details of a secure-microcontroller boot ROM.
Figure 4B:
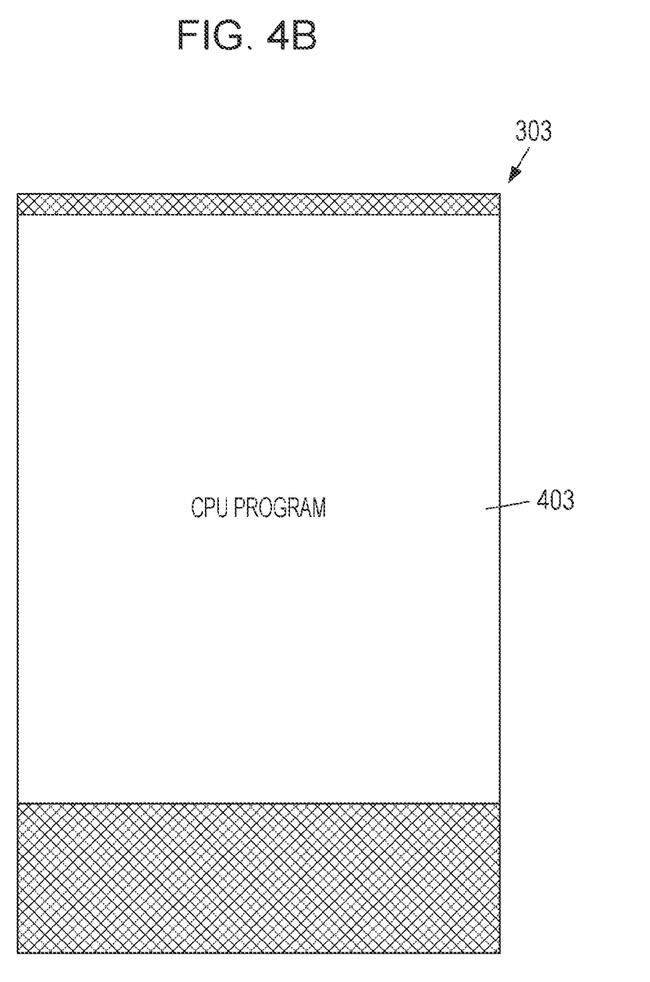
FIG. 4B is a diagram illustrating the details of a CPU boot ROM.

FIG. 4A is a diagram illustrating the programs stored in the secure-microcontroller boot ROM 316, and FIG. 4B is a diagram illustrating the program stored in the CPU boot ROM 303.

As illustrated in FIG. 4A, the secure-microcontroller boot ROM 316 stores the secure-microcontroller program 402 for starting the secure microcontroller 315. The secure-microcontroller boot ROM 316 further stores the recovery program 401 for recovering the CPU program 403. The recovery program 401 is a program for returning the CPU program 403 to a state at the restoration point such as at the time of shipment. For example, the recovery program 401 corresponds to the CPU program 403 at the restoration point.

As illustrated in FIG. 4B, the CPU boot ROM 303 stores the CPU program 403 for starting the CPU 301. The CPU program 403 is verified by the secure microcontroller 315. The CPU 301 executes the CPU program 403, which is determined by the secure microcontroller 315 to have been unmodified.

Configuration of SPI Bus

Figure 5:
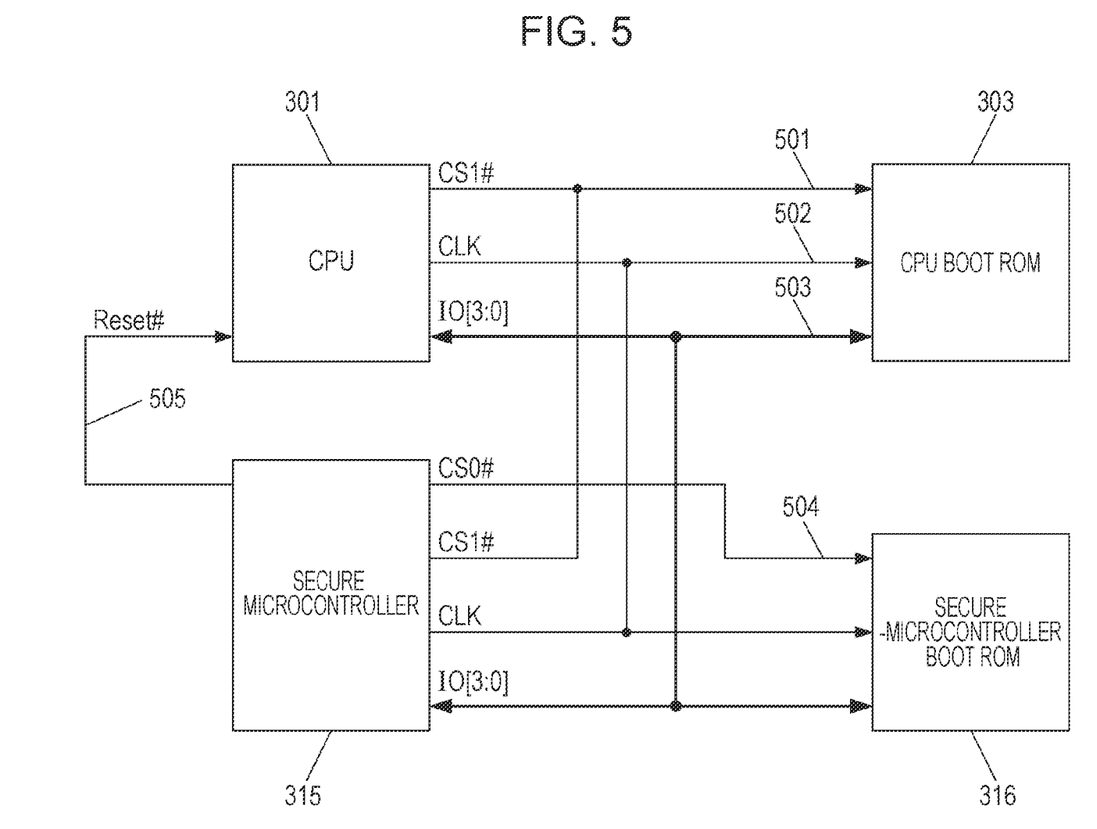
FIG. 5 is a diagram illustrating the configuration of a bus that connects a CPU, a secure microcontroller, and the boot ROMs.

FIG. 5 illustrates a bus configuration for accessing each ROM. A description will now be given taking a Serial Peripheral Interface (SPI) bus as an example. However, the disclosure is not limited to the SPI bus.

A signal 501 is an SPI chip select signal (CS1#). The chip select signal is a signal for selecting a read-target device and a write-target device. The chip select signal 501 is a signal to be used to access the CPU boot ROM 303. The chip select signal 501 can be used by both the CPU 301 and the secure microcontroller 315. Thus, when the secure microcontroller 315 accesses the CPU boot ROM 303, the secure microcontroller 315 controls the chip select signal 501. When the CPU 301 accesses the CPU boot ROM 303, the CPU 301 controls the chip select signal 501.

A signal 502 is an SPI clock signal (CLK). The clock signal 502 is supplied from the CPU 301, which is the master device, to the CPU boot ROM 303 and the secure-microcontroller boot ROM 316. The secure microcontroller 315 can also supply the clock signal 502 to the CPU boot ROM 303 and the secure-microcontroller boot ROM 316. Thus, when the secure microcontroller 315 accesses the CPU boot ROM 303 or the secure-microcontroller boot ROM 316, the secure microcontroller 315 controls the clock signal 502. When the CPU 301 accesses the CPU boot ROM 303 or the secure-microcontroller boot ROM 316, the CPU 301 controls the clock signal 502.

A signal 503 is an SPI data bus signal (IO). The data bus signal 503 is a signal for writing data to the CPU boot ROM 303 and the secure-microcontroller boot ROM 316 or reading data from the CPU boot ROM 303 and the secure-microcontroller boot ROM 316. The data bus signal 503 can be used by both the CPU 301 and the secure microcontroller 315. Thus, when the secure microcontroller 315 accesses the CPU boot ROM 303 or the secure-microcontroller boot ROM 316, the secure microcontroller 315 controls the data bus signal 503. When the CPU 301 accesses the CPU boot ROM 303 or the secure-microcontroller boot ROM 316, the CPU 301 controls the data bus signal 503.

A signal 504 is an SPI chip select signal (CS0#). The chip select signal 504 is used to access the secure-microcontroller boot ROM 316. In one embodiment, the chip select signal 504 can used only by the secure microcontroller 315. Since the CPU 301 is not allowed to control the chip select signal 504, the secure-microcontroller boot ROM 316 is not accessible from the CPU 301.

A signal 505 is a signal (Reset#) for the secure microcontroller 315 to cancel the reset of the CPU 301. The secure microcontroller 315 verifies the CPU program 403 in the CPU boot ROM 303. If it is determined that the CPU program 403 has been unmodified, the secure microcontroller 315 changes the reset signal 505 from "low" to "high". When the reset signal 505 becomes "high" (the reset is canceled), the CPU 301 executes the CPU program 403 in the CPU boot ROM 303.

Operation of Secure Microcontroller

Figure 6:
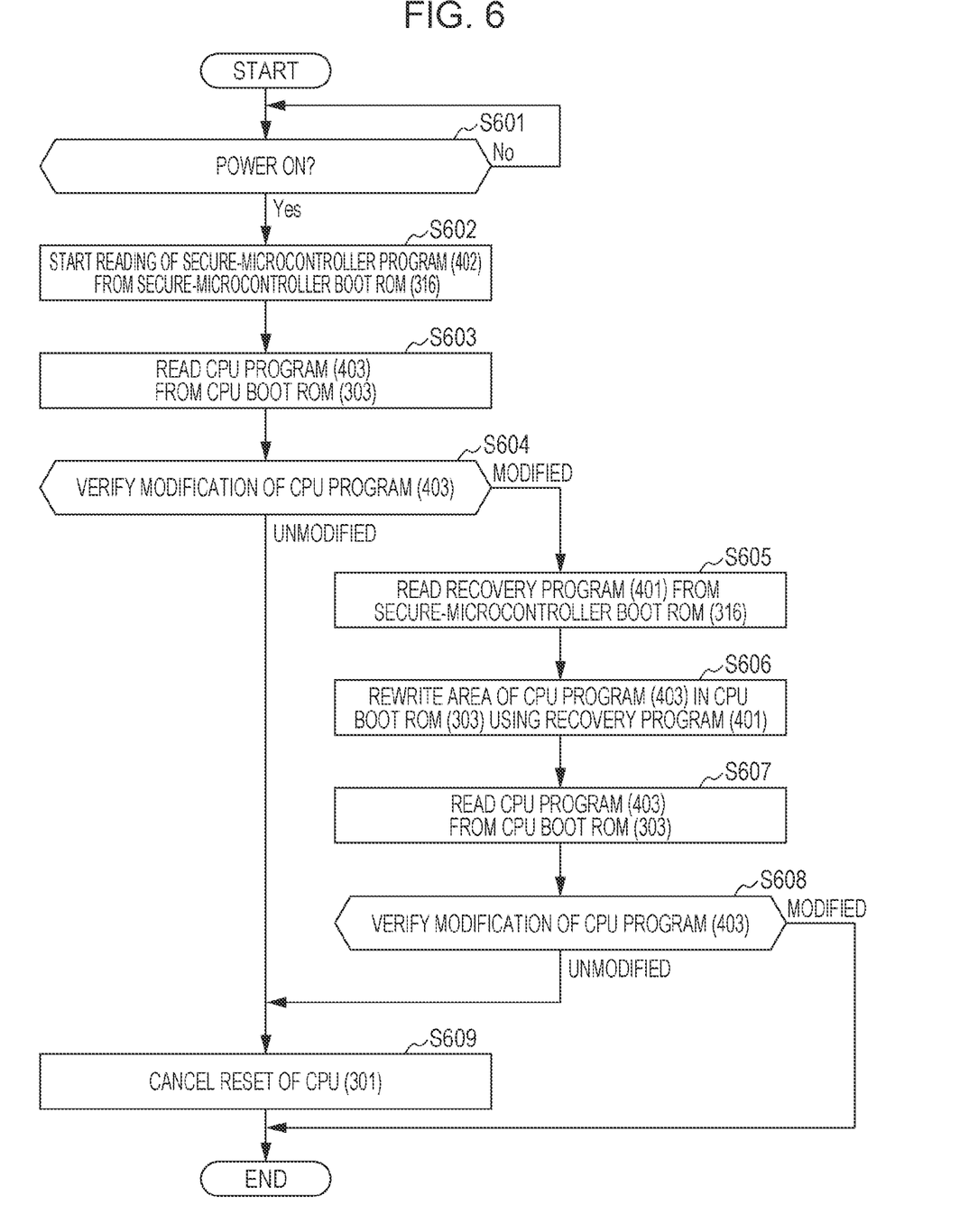
FIG. 6 is a flowchart executed by the secure microcontroller.

FIG. 6 is a flowchart of the operation of the secure microcontroller 315.

In S601, no power is supplied to the secure microcontroller 315. When the power supply to the secure microcontroller 315 is turned on, the process proceeds to S602. In S602, the secure microcontroller 315 reads the secure-microcontroller program 402 from the secure-microcontroller boot ROM 316. Then, the secure microcontroller 315 verifies the secure-microcontroller program 402 using the key information stored in the fuse inside the secure microcontroller 315. If it is determined that the secure-microcontroller program 402 has been unmodified, the secure microcontroller 315 executes the secure-microcontroller program 402.

Then, in S603, after executing the secure-microcontroller program 402, the secure microcontroller 315 reads the CPU program 403 stored in the CPU boot ROM 303. In S604, the secure microcontroller 315 verifies the read CPU program 403. Specifically, the secure microcontroller 315 detects modification of the CPU program 403, based on the hash value of the read CPU program 403 and a correct value. If the secure microcontroller 315 determines that the read CPU program 403 has been unmodified, the process proceeds to S609. If the secure microcontroller 315 determines that the read CPU program 403 has been modified, the process proceeds to S605.

In S605, the secure microcontroller 315 reads the recovery program 401 stored in the secure-microcontroller boot ROM 316. The secure microcontroller 315 reads the recovery program 401 to recover the CPU program 403 stored in the CPU boot ROM 303 and determined to have been modified.

In S606, the secure microcontroller 315 rewrites the CPU program 403 stored in the CPU boot ROM 303 using the read recovery program 401. Specifically, the secure microcontroller 315 writes the recovery program 401, which is read from the secure-microcontroller boot ROM 316 in S605, to the area of the CPU boot ROM 303 where the CPU program 403 is stored. As a result, the modified data in the CPU boot ROM 303 can be recovered.

Then, in S607, the secure microcontroller 315 reads the CPU program 403 stored in the CPU boot ROM 303. Then, in S608, the secure microcontroller 315 verifies the read CPU program 403. The secure microcontroller 315 determines whether the CPU program 403 read in S607 has been modified. If it is determined that the read CPU program 403 has been unmodified, the process proceeds to S609. If it is determined that the read CPU program 403 has been modified, the process is stopped. The image forming apparatus 10 may be shut down. The second verification (S607 and S608) of the CPU program 403 is optional.

In S609, the secure microcontroller 315 cancels the reset of the CPU 301. The secure microcontroller 315 changes the reset signal 505 for the CPU 301 from "low" to "high" to cancel the reset of the CPU 301. Accordingly, the operation of the CPU 301 is enabled.

Operation of CPU

Figure 7:
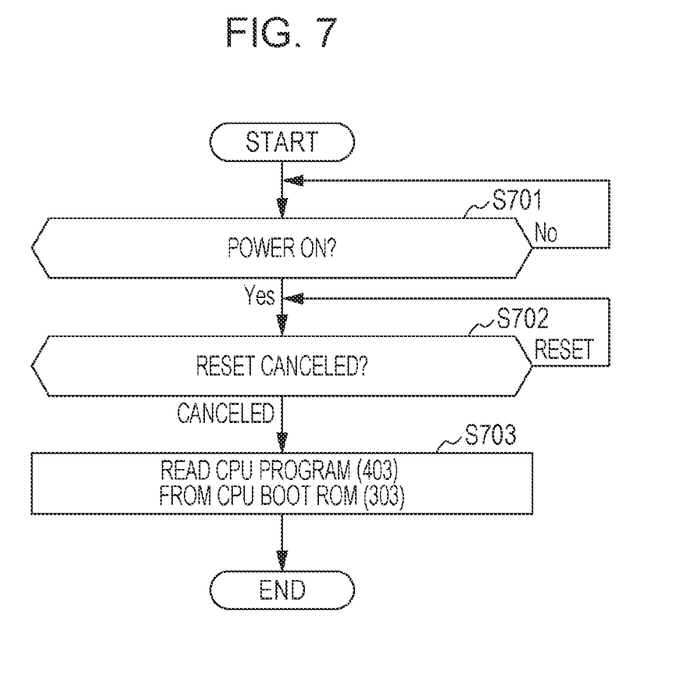
FIG. 7 is a flowchart executed by the CPU.

FIG. 7 is a flowchart of the operation of the CPU 301.

In S701, no power is supplied to the CPU 301. When the power supply is turned on, the process proceeds to S702. In S702, the CPU 301 is in the reset state. When the reset is canceled, the process proceeds to S703. The reset of the CPU 301 is canceled by the secure microcontroller 315 through the processing of S609 in FIG. 6. Then, the process proceeds to S703.

In S703, the CPU 301 reads the CPU program 403 from the CPU boot ROM 303 and executes the CPU program 403. The CPU 301 executes the CPU program 403, which is determined by the secure microcontroller 315 to have been unmodified.

As described above, the secure-microcontroller boot ROM 316 is configured not to be accessible from the CPU 301 to protect the secure-microcontroller boot ROM 316 against cyber attacks. Even if the CPU program 403 in the CPU boot ROM 303 is modified, the CPU program 403 can be reliably recovered using the recovery program 401 in the secure-microcontroller boot ROM 316.

Second Embodiment

In the first embodiment, the secure microcontroller 315 executes the secure-microcontroller program 402 stored in the secure-microcontroller boot ROM 316. Alternatively, the CPU boot ROM 303 may store a secure-microcontroller program 404, and the secure microcontroller 315 may execute the secure-microcontroller program 404 stored in the CPU boot ROM 303.

Figure 8A:
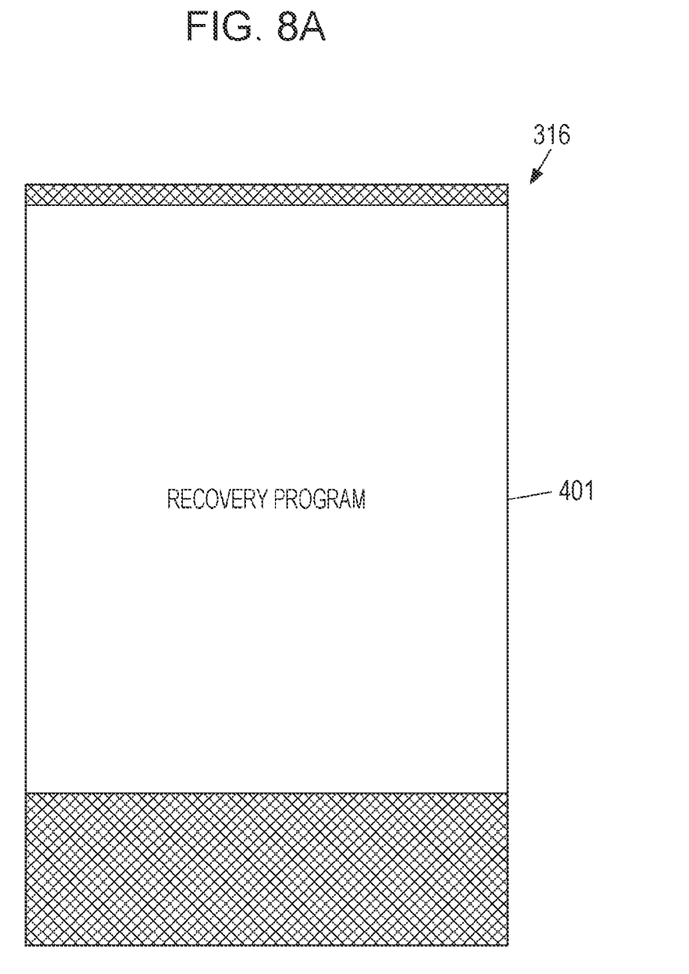
FIG. 8A is a diagram illustrating the details of a secure-microcontroller boot ROM according to a second embodiment.
Figure 8B:
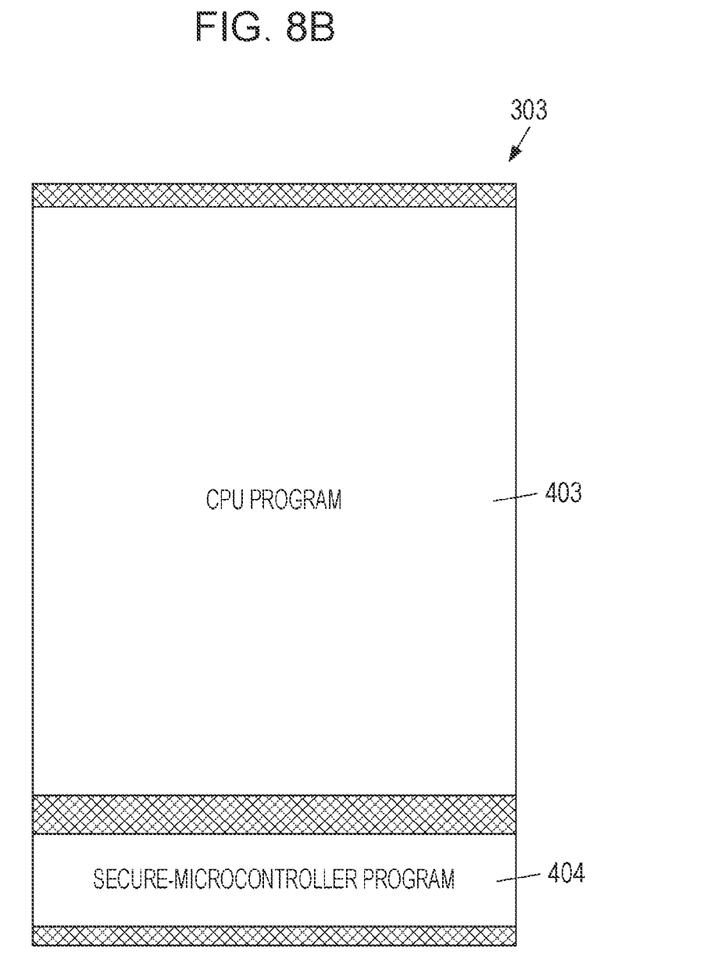
FIG. 8B is a diagram illustrating the details of a CPU boot ROM according to the second embodiment.

FIG. 8A is a diagram illustrating a program stored in the secure-microcontroller boot ROM 316, and FIG. 8B is a diagram illustrating programs stored in the CPU boot ROM 303.

As illustrated in FIG. 8A, the secure-microcontroller boot ROM 316 stores the recovery program 401 for the CPU program 403.

As illustrated in FIG. 8B, the CPU boot ROM 303 stores the CPU program 403 for starting the CPU 301. The CPU program 403 is verified by the secure microcontroller 315. The CPU 301 executes the CPU program 403, which is determined by the secure microcontroller 315 to have been unmodified. In a second embodiment, the CPU boot ROM 303 stores the secure-microcontroller program 404 for starting the secure microcontroller 315.

Figure 9:
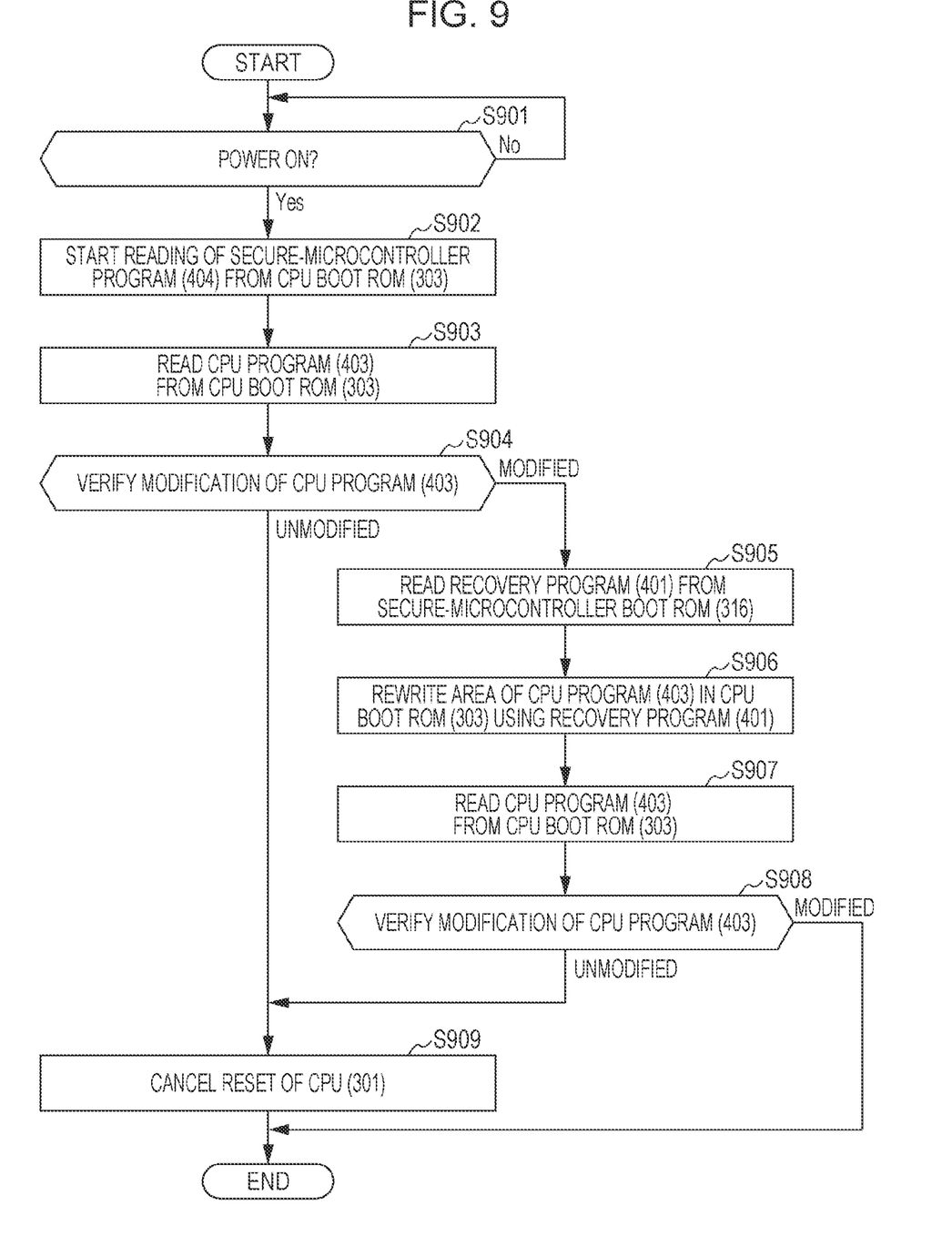
FIG. 9 is a flowchart executed by a secure microcontroller according to the second embodiment.

FIG. 9 is a flowchart of the operation of the secure microcontroller 315.

In S901, no power is supplied to the secure microcontroller 315. When the power supply to the secure microcontroller 315 is turned on, the process proceeds to S902. In S902, the secure microcontroller 315 reads the secure-microcontroller program 404 from the CPU boot ROM 303 and verifies the secure-microcontroller program 404 using the key information stored in the fuse inside the secure microcontroller 315. If it is determined that the secure-microcontroller program 404 has been unmodified, the secure microcontroller 315 executes the secure-microcontroller program 404.

Then, in S903, after executing the secure-microcontroller program 404, the secure microcontroller 315 reads the CPU program 403 stored in the CPU boot ROM 303. In S904, the secure microcontroller 315 verifies the read CPU program 403. Then, the secure microcontroller 315 determines whether the CPU program 403 read in S903 has been unmodified by a cyber attack or the like. If the secure microcontroller 315 determines that the read CPU program 403 has been unmodified, the process proceeds to S909. If the secure microcontroller 315 determines that the read CPU program 403 has been modified, the process proceeds to S905.

In S905, the secure microcontroller 315 reads the recovery program 401 stored in the secure-microcontroller boot ROM 316. The secure microcontroller 315 reads the recovery program 401 to recover the CPU program 403 stored in the CPU boot ROM 303 and determined to have been modified.

In S906, the secure microcontroller 315 rewrites the CPU program 403 stored in the CPU boot ROM 303 using the read recovery program 401. Specifically, the secure microcontroller 315 writes the recovery program 401, which is read from the secure-microcontroller boot ROM 316 in S905, to the area of the CPU boot ROM 303 where the CPU program 403 is stored. As a result, the modified data in the CPU boot ROM 303 can be recovered.

Then, in S907, the secure microcontroller 315 reads the CPU program 403 stored in the CPU boot ROM 303. Then, in S908, the secure microcontroller 315 verifies the read CPU program 403. The secure microcontroller 315 determines whether the CPU program 403 read in S907 has been modified. If it is determined that the read CPU program 403 has been unmodified, the process proceeds to S909. If it is determined that the read CPU program 403 has been modified, the process is stopped. The second verification (S907 and S908) of the CPU program 403 is optional.

In S909, the secure microcontroller 315 cancels the reset of the CPU 301. The secure microcontroller 315 changes the reset signal 505 for the CPU 301 from "low" to "high" to cancel the reset of the CPU 301. Accordingly, the operation of the CPU 301 is enabled.

Other Embodiments

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-175007, filed Oct. 16, 2020, which is hereby incorporated by reference herein in its entirety.

What is claimed is:

1. An apparatus comprising:
a processor;
a first memory configured to store a first program to be executed by the processor;
a detector configured to detect modification of the first program; and
a second memory configured to store a recovery program for recovering the first program in response to the detector detecting modification of the first program,
wherein the recovery program is accessible from the detector, and not accessible from the processor; and
a second signal for selecting the second memory allows the detector to access the recovery program and the detector is thereby able to select the second memory as a read-target memory, and the second signal does not allow the processor to access the recovery program and the processor is thereby not able to select the second memory as a read-target memory.

2. The apparatus according to claim 1, wherein
the first memory further stores a second program to be executed by the detector, and
the detector executes the second program at startup of the apparatus.

3. The apparatus according to claim 2, wherein
the detector stores key information, and
the detector executes the second program, the second program being determined to have been unmodified using the key information.

4. The apparatus according to claim 2, further comprising a printer configured to print an image on a storage medium.

5. The apparatus according to claim 2, further comprising a reader configured to read an image on a document.

6. The apparatus according to claim 1, wherein the detector is connected to a first signal for selecting the first memory.

7. The apparatus according to claim 1, further comprising a printer configured to print an image on a storage medium.

8. The apparatus according to claim 1, further comprising a reader configured to read an image on a document.

9. The apparatus according to claim 1, wherein the detector is connected to a chip select second signal for selecting the second memory, and the processor is not connected to the chip select second signal.

10. The apparatus according to claim 9, wherein the detector is connected to the chip select second signal for selecting the second memory and a chip select first signal for selecting the first memory different from the chip select second signal for selecting the second memory.

11. An apparatus comprising:
a processor;
a first memory configured to store a first program to be executed by the processor;
a detector configured to detect modification of the first program; and
a second memory configured to store a recovery program for recovering the first program in response to the detector detecting modification of the first program,
wherein the recovery program is accessible from the detector, and not accessible from the processor,
wherein the second memory further stores a second program to be executed by the detector,
the detector executes the second program at startup of the apparatus; and
a second signal for selecting the second memory allows the detector to access the recovery program and the detector is thereby able to select the second memory as a read-target memory, and the second signal does not allow the processor to access the recovery program and the processor is thereby not able to select the second memory as a read-target memory.

12. The apparatus according to claim 11, wherein
the detector stores key information, and
the detector executes the second program, the second program being determined to have been unmodified using the key information.

13. The apparatus according to claim 11, wherein the detector is connected to the chip select second signal for selecting the second memory and a chip select first signal for selecting the first memory different from the chip select second signal for selecting the second memory.

14. The apparatus according to claim 11, further comprising a printer configured to print an image on a storage medium.

15. The apparatus according to claim 11, further comprising a reader configured to read an image on a document.

* * * * *